Patented Apr. 9, 1946

2,398,126

UNITED STATES PATENT OFFICE 2,398,126

DEHYDROGENATION OF HYDROCARBONS

Carlisle M. Thacker, Highland Park, and Richmond T. Bell, Deerfield, Ill., assignors to The Pure Oil Company, Chicago, Ill., a corporation of Ohio No Drawing. Application October 31, 1942,
Serial No. 464,104

6 Claims. (Cl. 260—683.3)

This invention relates to an improvement in the method of dehydrogenating hydrocarbons containing two or more carbon atoms in the molecule.

Various catalysts have been suggested and used in the dehydrogenation of various hydrocarbons. Probably the best known catalyst for this purpose is Activated Alumina impregnated with chromium oxide. By the term "Activated Alumina" is meant a product prepared by calcining aluminum trihydrate at a temperature of between 300 and 800° C. The aluminum trihydrate may be obtained from the hard scale formed on the inside of the alumina precipitation tanks used in the Bayer process; or bauxite may be used as a source of the aluminum trihydrate; or the aluminum trihydrate may be precipitated from solutions of aluminum salts. The method of preparing activated alumina is disclosed in the patent to Derr No. 2,015,593.

We have discovered that the catalytic dehydrogenation of hydrocarbons can be accelerated, and improved yields of desired dehydrogenated compounds obtained by carrying out the reaction in the presence of mercury vapor. Although we prefer to use Activated Alumina impregnated with a metal of the sixth group of the periodic table, such as chromium, molybdenum or tungsten, or with other metals such as vanadium, copper or magnesium, or with compounds, preferably oxides, of any of the foregoing metals, our invention is applicable to dehydrogenation in the presence of other solid dehydrogenating catalysts such as a mixture of chromium oxide and zinc oxide, alone or supported on a carrier such as activated carbon, Fuller's earth or silica gel, Activated Alumina which is not impregnated with a metal or metal compound and co-precipitated alumina-chromic oxide gels. The aforesaid dehydrogenating catalysts have all been disclosed in the art.

In accordance with our invention a small amount of mercury vapor is mixed with the vapors of the particular hydrocarbon or mixture of hydrocarbons which it is desired to dehydrogenate. Although the amount of mercury vapor used may vary within rather wide limits, we have found mercury vapor to be effective must be present in amounts not lower than approximately 0.1% by volume of the vapors or gases undergoing reaction and may be used in amounts as high as 5%. The invention is applicable to the dehydrogenation of paraffinic hydrocarbons to olefinic, diolefinic, acetylenic and aromatic hydrocarbons. It is also applicable to the dehydrogenation of olefinic to diolefinic, aromatic and acetylenic hydrocarbons and to the dehydrogenation of an aliphatic side chain in an aromatic hydrocarbon, as for example the dehydrogenation of ethylbenzene to styrene. When it is desired to dehydrogenate to diolefins and acetylenes the use of sub-atmospheric pressures is helpful.

In order to demonstrate our invention a series of runs was carried out in laboratory scale apparatus utilizing a small steel tube as a reaction chamber using butane of 98% purity as charging stock. An attempt was made to carry out all runs at approximately the same temperature (525° C.) and at the same space velocity (500 volumes of gas per unit volume of catalyst per hour). The results are tabulated in the following table. The figures under the heading in the following table "yield of unsaturates in volume produced per unit volume of $C_4H_{10}$ charged" are based on effluent gases from the process. The quantity of liquid formed in the various runs constituted only a trace and was too small to measure or analyze.

| Run No. | Space velocity in vol./hr. | Mercury pressure in mm. | Gas sample taken hours from start | Volume exit gas divided by volume of inlet gas | Yield of unsaturates in volume produced per unit volume of $C_4H_{10}$ charged | Volume per cent $C_4H_{10}$ reacting | Weight per cent efficiency | Exit gas, per cent by volume | | Temp. of reaction °C. |
|---|---|---|---|---|---|---|---|---|---|---|
| | | | | | | | | $H_2$ | Unsaturates | |
| 1 | 500 | 0 | 6–6.5 | 0.998 | | | | 0 | 0.4 | 523–7 |
| 1a | 502 | 0 | 11.5–12 | 0.994 | | | | 0 | 0.3 | 520–7 |
| 2 | 507 | 11.4 | 6–6.5 | 0.992 | | | | 0 | 1.1 | 521–5 |
| 2a | 516 | 11.4 | 11.5–12 | 0.991 | | | | 0 | 0.5 | 524–7 |
| 3 | 505 | 0 | 6–6.5 | 1.144 | 0.148 | 15.4 | 92 | 11.0 | 13.0 | 517–20 |
| 3a | 505 | 0 | 11.5–12 | 1.171 | 0.158 | 16.6 | 91 | 13.6 | 13.6 | 516–25 |
| 4 | 510 | 5.7 | 6–6.5 | 1.183 | 0.174 | 18.3 | 91 | 14.5 | 14.8 | 524–7 |
| 4a | 508 | 5.7 | 11.5–12 | 1.188 | 0.168 | 18.2 | 88 | 14.1 | 14.2 | 527–9 |
| 5 | 517 | 16.1 | 6–6.5 | 1.224 | 0.209 | 21.5 | 93 | 16.8 | 17.1 | 518–26 |
| 5a | 493 | 16.1 | 11.5–12 | 1.191 | 0.185 | 19.9 | 89 | 16.3 | 15.4 | 523–8 |
| 6 | 510 | 0 | 6–6.5 | 1.114 | 0.118 | 12.4 | 91 | 9.4 | 10.6 | 518–28 |
| 6a | 498 | 0 | 11.5–12 | 1.091 | 0.098 | 10.0 | 93 | 6.9 | 9.0 | 520–6 |
| 7 | 505 | 1.0 | 6–6.5 | 1.128 | 0.127 | 13.4 | 91 | 10.2 | 11.3 | 516–20 |
| 7a | 506 | 1.0 | 11.5–12 | 1.110 | 0.112 | 11.8 | 91 | 8.6 | 10.1 | 515–27 |
| 8 | 533 | 40.6 | 6–6.5 | 1.142 | 0.142 | 14.9 | 91 | 11.3 | 12.5 | 523–5 |
| 8a | 534 | 40.6 | 9–9.5 | 1.132 | 0.135 | 13.8 | 94 | 10.6 | 12.0 | 523–7 |

Runs 1, 1a, 2 and 2a were carried out in an empty reactor without any solid dehydrogenating catalyst being present in order to determine the effect of mercury in the absence of a solid dehydrogenating catalyst. Samples were taken at the end of 6 hours and at the end of 11½ hours and the results show that a slight amount of cracking occurred and that the dehydrogenation was nil.

The remaining runs were made with an Activated Alumina catalyst impregnated with chromium oxide in the proportion of 20 parts of Activated Alumina to 1 part of chromium. This catalyst was prepared by heating 6.8 kilograms of 4 to 8 mesh Activated Alumina obtained from The Aluminum Ore Company at 205° C. for 2 hours and then adding to the Activated Alumina a solution containing .33 kilograms of chromium oxide ($CrO_3$) dissolved in 1.7 liters of water. The mixture was stirred in a water bath in order to remove the excess water and heating was continued at 105° C. for from 2 to 4 hours in order to dry the catalyst.

Prior to using the catalyst it was reduced by heating it in the reactor to 250° C. over a period of 2 hours in the presence of hydrogen. The temperature was then raised to 400° C. and maintained for 4 hours in the presence of hydrogen. After each 12 hour run the catalyst was reactivated by burning with air at a temperature of approximately 550° C. until the exit gases were free of carbon dioxide and then reduced with hydrogen for a period of approximately 2 hours at a temperature of approximately 525° C.

The results obtained in runs 3 to 5a inclusive demonstrate that mercury, when used in conjunction with Activated Alumina impregnated with chromium oxide, materially increases the yield of butenes obtained and that the increase in yield is greater with the larger amount of mercury vapor mixture with the butane.

In runs 1 to 5a inclusive, the butane was passed through a calcium chloride drier prior to entering the reaction chamber. In runs 6 to 8a inclusive, butane was also passed through the calcium chloride drying tube but during these runs the calcium chloride tube was almost saturated with water and therefore was not as efficient in removing moisture as in previous runs. A comparison of runs 3 to 5a with runs 6 to 8a shows the deleterious effect of moisture on the dehydrogenation of the butane. However, although the yields are all lower when treating gas containing moisture, the presence of the mercury vapor nevertheless improves the yields obtainable by using the Activated Alumina chromium oxide catalyst in the absence of the mercury vapor. The increase in the yield, however, is not as marked as it is in the case of the dry gas.

In making the runs, the results of which are tabulated in the foregoing table, a gas sample was taken after the run had been in operation for 6 and for 11½ hours in order to determine the effectiveness of the mercury vapor on the dehydrogenation reaction at different stages of deactivation of the dehydrogenating catalyst. The results indicate that the mercury vapor was effective in improving the yield of butenes throughout the entire run.

Space velocity as used herein is defined as the total volume of gases (butane and mercury vapor) at 0° C. and 760 mm. passing over the catalyst per hour, divided by the volume occupied by the catalyst.

Weight per cent efficiency is the total weight of unsaturates formed during the reaction as determined by analysis of the gas samples, divided by the total weight of butane reacted.

It will be apparent to those skilled in the art that the mercury vapor can be recovered from the exit gases of the reaction by known methods and recycled to the process for further use.

Although the runs for which results are tabulated were all carried out using butane as a charging stock, the invention is applicable to dehydrogenatable hydrocarbons in general. The temperature at which the dehydrogenation is carried out will vary with the particular charging stock and dehydrogenating catalyst used and to some extent with the space velocity. In general, lower boiling hydrocarbons require higher temperatures than do the higher boiling hydrocarbons. The more active dehydrogenation catalysts require lower temperatures than do the less active catalysts, and higher space velocities require higher temperatures in order to get yields comparable to those obtained at lower space velocities. The temperature range will generally be between 400 to 700° C. and the space velocity may range from 100 to 3000. Care should be exercised to keep the temperature below that at which appreciable cracking, i. e. scission between carbon to carbon bonds in the molecule, occurs. The optimum temperature and space velocity for each charging stock and each catalyst can be determined empirically. If the temperature and space velocity are adjusted so that no appreciable cracking would occur in the absence of the mercury, the mercury will not promote the cracking reaction under these conditions as is shown by the efficiencies and the hydrogen-unsaturate ratio of the exit gas in the various runs with and without mercury vapor.

We claim:

1. The process of dehydrogenating dehydrogenatable hydrocarbons containing two or more carbon atoms in the molecule to hydrocarbons of the same number of carbon atoms without appreciable splitting of the hydrocarbons into hydrocarbons having a lesser number of carbon atoms per molecule comprising contacting said hydrocarbons containing from 0.1 to 5% by volume of mercury vapor with a dehydrogenating catalyst composed of a solid porous catalyst carrier and a substance selected from the group consisting of metals and oxides capable of promoting the dehydrogenating action of the porous catalyst carrier, at a temperature within the range of 400 to 700° C. and at a space velocity between 100 and 3000 at which no appreciable scisson of carcomprise chiefly butanes.

2. Process in accordance with claim 1 in which the hydrocarbons subjected to dehydrogenation comprises chiefly butanes.

3. Process in accordance with claim 1 in which the catalyst is Activated Alumina made by calcining aluminum trihydrate at 300° to 800° C. impregnated with a chromium compound.

4. Process in accordance with claim 1 in which the catalyst is Activated Alumina made by calcining aluminum trihydrate at 300° to 800° C. impregnated with a molybdenum compound.

5. Process in accordance with claim 1 in which the catalyst is coprecipitated alumina-chromia gel.

6. The process of dehydrogenating butanes to hydrocarbons of the same number of carbon atoms without appreciable scisson of carbon to carbon bonds comprising contacting the butanes with Activated Aluminum made by calcining aluminum trihydrate at 300° to 800° C. impregnated with chromium oxide at temperatures of approximately 500–550° C. and at a space velocity of approximately 500 in the presence of about 0.1 to 5% by volume of mercury vapor.

CARLISLE M. THACKER.
RICHMOND T. BELL.